United States Patent
Kim et al.

(10) Patent No.: US 9,564,164 B2
(45) Date of Patent: Feb. 7, 2017

(54) EXCHANGE DECOUPLED DATA STORAGE MEDIUM

(71) Applicant: Seagate Technology LLC, Cupertino, CA (US)

(72) Inventors: Jai-Young Kim, San Ramon, CA (US); Terry Lee Morkved, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 209 days.

(21) Appl. No.: 14/136,615

(22) Filed: Dec. 20, 2013

(65) Prior Publication Data
US 2015/0179202 A1    Jun. 25, 2015

(51) Int. Cl.
G11B 5/66    (2006.01)

(52) U.S. Cl.
CPC ..................... G11B 5/66 (2013.01)

(58) Field of Classification Search
CPC ............ G11B 5/66; G11B 5/667; G11B 5/656
See application file for complete search history.

(56) References Cited

U.S. PATENT DOCUMENTS

| | | | |
|---|---|---|---|
| 6,834,026 B2 | 12/2004 | Fullerton et al. | |
| 7,166,376 B2 | 1/2007 | Hikosaka et al. | |
| 7,201,977 B2 | 4/2007 | Li et al. | |
| 7,502,188 B2 | 3/2009 | Inomata et al. | |
| 7,768,731 B2 | 8/2010 | Inomata et al. | |
| 7,782,562 B2 | 8/2010 | Kamata et al. | |
| 8,114,470 B2 | 2/2012 | Gao et al. | |
| 8,187,452 B2 | 5/2012 | Riemer et al. | |
| 8,465,854 B2 | 6/2013 | Tang et al. | |
| 2003/0108721 A1 | 6/2003 | Fullerton et al. | |
| 2005/0058855 A1 | 3/2005 | Girt | |
| 2005/0068688 A1 | 3/2005 | Sbiaa et al. | |
| 2007/0020486 A1 | 1/2007 | Berger et al. | |
| 2009/0092858 A1 | 4/2009 | Chen et al. | |
| 2010/0247962 A1* | 9/2010 | Sasaki | 428/800 |
| 2011/0003175 A1 | 1/2011 | Valcu et al. | |
| 2011/0311841 A1 | 12/2011 | Saito et al. | |
| 2012/0026626 A1 | 2/2012 | Nolan et al. | |
| 2013/0320254 A1 | 12/2013 | Bhatia et al. | |
| 2014/0002919 A1* | 1/2014 | Takahoshi et al. | 360/48 |

FOREIGN PATENT DOCUMENTS

| | | |
|---|---|---|
| EP | 1551008 A3 | 5/2007 |
| KR | 10-2008-0052134 A | 6/2008 |
| WO | 2011/125403 A1 | 10/2011 |

OTHER PUBLICATIONS

Kazuhiro Ouch and Naoki Honda, "Overview of Latest Work on Perpendicular Recording Media," IEEE Transactions on Magnetics, Jan. 2000, pp. 16-22, vol. 36, No. 1, IEEE.

* cited by examiner

*Primary Examiner* — Holly Rickman

(74) *Attorney, Agent, or Firm* — Hall Estill Attorneys at Law

(57) ABSTRACT

A magnetic data storage medium capable of storing data bits may be configured at least with a magnetic underlayer structure and a recording structure. The recording structure can have at least a first magnetic layer and a second magnetic layer with the first magnetic layer decoupled by being constructed of an alloy of cobalt, platinum, and a platinum group metal element.

20 Claims, 6 Drawing Sheets

EXCHANGE DECOUPLED DATA STORAGE MEDIUM

SUMMARY

Various embodiments configure a data storage medium with a magnetic underlayer structure and a recording structure. The recording structure can have at least a first magnetic layer and a second magnetic layer with the first magnetic layer decoupled by being constructed of an alloy of cobalt, platinum, and a platinum group metal element.

DETAILED DESCRIPTION

Industry and consumer demand for increased data storage capacity in smaller form factors has increased the data bit density in a data storage medium. Such increased data bit density can correspond with heightened sensitivity to magnetic interactions between data bits. For example, magnetic coupling within and between data bits of a common data storage medium can jeopardize data bit reading and writing performance. While granular perpendicular recording data bits can provide control of some magnetic interactions among different data bits, such data bit construction fails to suppress magnetic coupling within the respective data bit grains. Hence, data bit construction with robust control of magnetic coupling can optimize data storage medium performance, especially in reduced form factor data storage devices.

With these issues in mind, a data storage medium can be configured with magnetic underlayer and recording structures where the recording structure has at least first and second magnetic layers with the first magnetic layer decoupled by being constructed of an alloy of cobalt, platinum, and a platinum group metal element. The tuned construction of the second magnetic layer to have a predetermined alloy structure allows for more robust control of magnetic coupling within a data bit. Such tuned data bit construction may be used in combination with a granular oxide boundary to optimize dynamic data bit recording conditions, such as bit error rate, side track erasure, and reverse overwriting.

Figure 1:
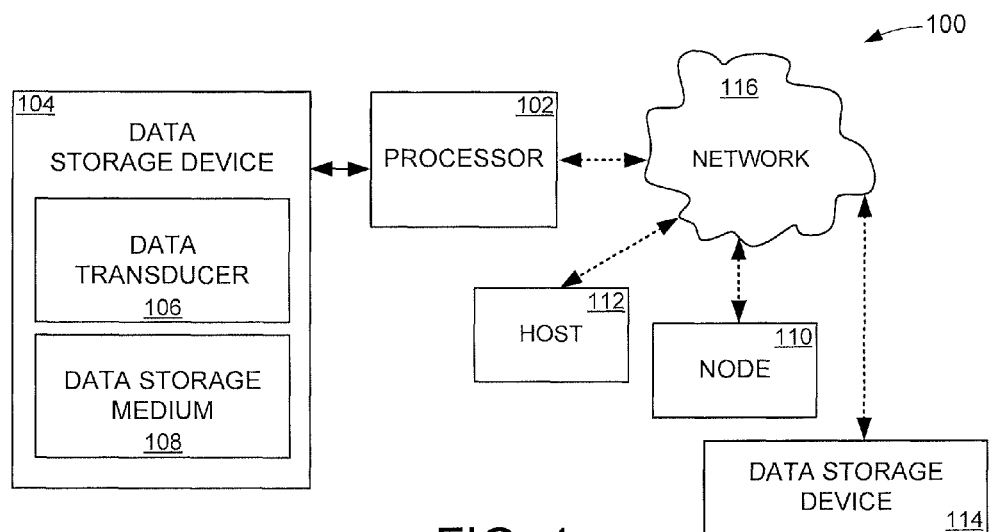
FIG. 1 is a block representation of an example computing system configured in accordance with various embodiments.

While a data bit with tuned material construction can be practiced in an unlimited variety of environments, FIG. 1 provides a block representation of an example computing system 100 in which a tuned data bit can be employed in accordance with various embodiments. The computing system 100 is configured with at least one local processor 102, or controller, that communicates with and controls one or more data storage devices 104 individually or collectively. The data storage device 104 can be constructed and operated with one or more data transducers 106 communicating with at least one data storage medium 108 to store data in the form of data bits having predetermined magnetic polarities stored on a plurality of data bit grains.

Assorted embodiments may package the local processor 102 within the data storage device 104 while other embodiments utilize multiple processors 102 internal and external to the data storage device 104. The use of one or more local processors 102 can allow multiple data storage devices 104 to be employed as part of a local data storage scheme, such as a redundant array of independent disks (RAID) scheme. The ability for the local processor 102 to communicate to remote nodes 110, hosts 112, and data storage devices 112 over a network 114 via appropriate protocol allows for a wide variety of data storage capabilities, such as data caching, while providing increased processing power and data access speeds. It should be noted that the network 114 can be wired and wireless to connect the local processor 102 to a variety of different computing components, without limitation. As such, the computing system 100 can be tuned to utilize a diverse range of computing components to provide virtually any type of data storage capability, such as cloud computing, virtual machines, and redundant storage arrays.

Figure 2:
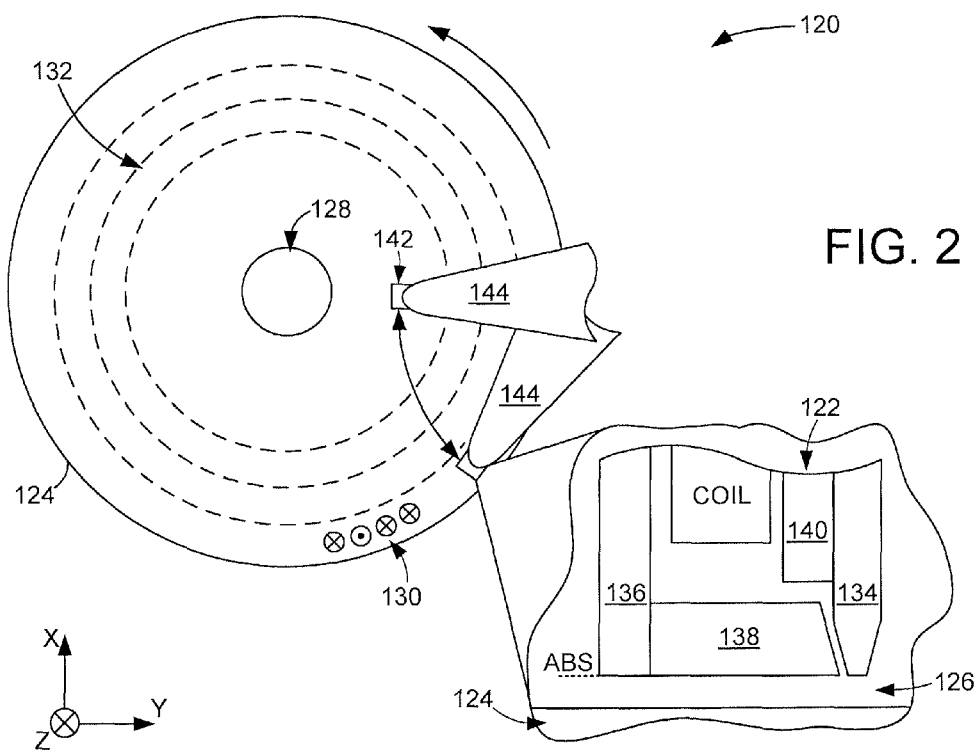
FIG. 2 shows top and cross-sectional block representations of portions of an example data storage device capable of being used in the computing system of FIG. 1.

FIG. 2 displays a block representation of a portion of an example data storage device 120 configured and operated in accordance with assorted embodiments. The data storage device 120 employs a data bit programming transducer 122 positioned adjacent to and separated from a data storage medium 124 by an air bearing 126. Control of a spindle motor 128 by one or more local and remote controllers can rotate the data storage medium 124 and produce a predetermined air bearing 126 on which the data transducer 122 flies to access selected data bits 130. Through actuated movement of the data transducer 122 in conjunction with the rotation of the data storage medium 124, selected data bits 130 as part of different data tracks 132 can be accessed to read and write predetermined magnetic polarities that correspond with logic states and digital memory.

The programming of one or more data bits 130 can be achieved with an unlimited variety of transducing configurations. As shown in the cross-sectional portion of FIG. 2, the data transducer 122 has a main pole 134 separated from a return pole 136 by a magnetic shield 138 and write gap on the air bearing surface (ABS). The respective poles 134 and 136 can have shapes and sizes conducive to completing a magnetic circuit from the main pole 134 to the return pole 136 through the data storage medium 134. The magnetic circuit can emit magnetic flux that is produced by a magnetic coil and emitted from the main pole 134 due to a yoke 140 conducting magnetic flux towards the main pole 134.

The transducing portion 122 may reside on a head gimbal assembly 142 portion of an actuating assembly 144 alone or in combination with other transducing means, such as a data sensing resistive sensor. Demand for increased data storage capacity has data tracks 132 with reduced widths and data bits 130 with greater density in order to fit more data bits 130 on the data storage medium 124. Such a reduction in the space between data bits 130 can emphasize the minimization of unwanted magnetic interactions between and within data bits 130 on the data storage medium 124.

Figure 3:
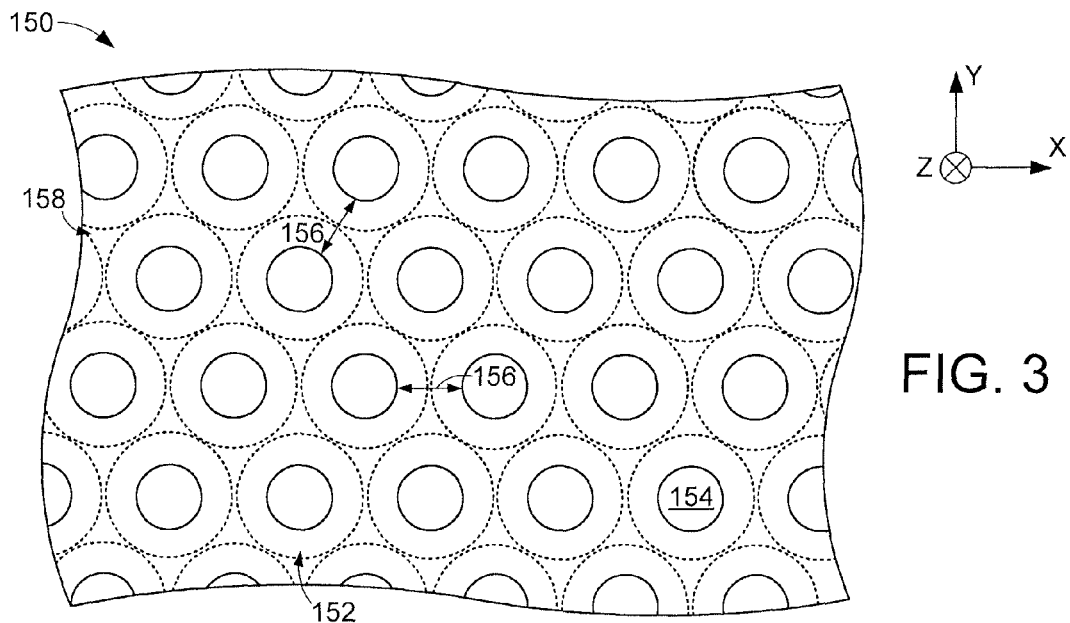
FIG. 3 displays a top view block representation of a portion of an example data storage medium constructed and operated in accordance with various embodiments.

FIG. 3 is a top view block representation of a portion of an example data storage medium 150 constructed and operated in accordance with some embodiments to have a continuous granular composite (CGC) structure. As shown, patterned data bits 152 on the data storage medium 150 can respectively have a granular core 154 that is longitudinally aligned along the Z axis, perpendicular to the ABS, to provide perpendicular magnetic recording within each data bit 152. The granular cores 154 can be configured to employ a predetermined amount of lateral exchange coupling 156 with adjacent granular cores 154 to reduce magnetic switching field and average coercivity of the respective data bits 152.

The (CGC) structure of the data storage medium 150 can continuously extend above the granular cores 154 and non-magnetic boundary 158 to provide coherent, reduced magnetization orientation switching in a heightened data bit density environment by controlling grain-to-grain exchange. While the continuous or discontinuous non-magnetic boundary 158 surrounding the respective granular cores 154 can suppress unwanted magnetic coupling between data bits 152, internal magnetic coupling within a granular core 154 can degrade data bit recording performance. It is contemplated that such internal granular core 154 magnetic coupling can be at least partially attributed to the material construction of the granular core 154.

Figure 4:
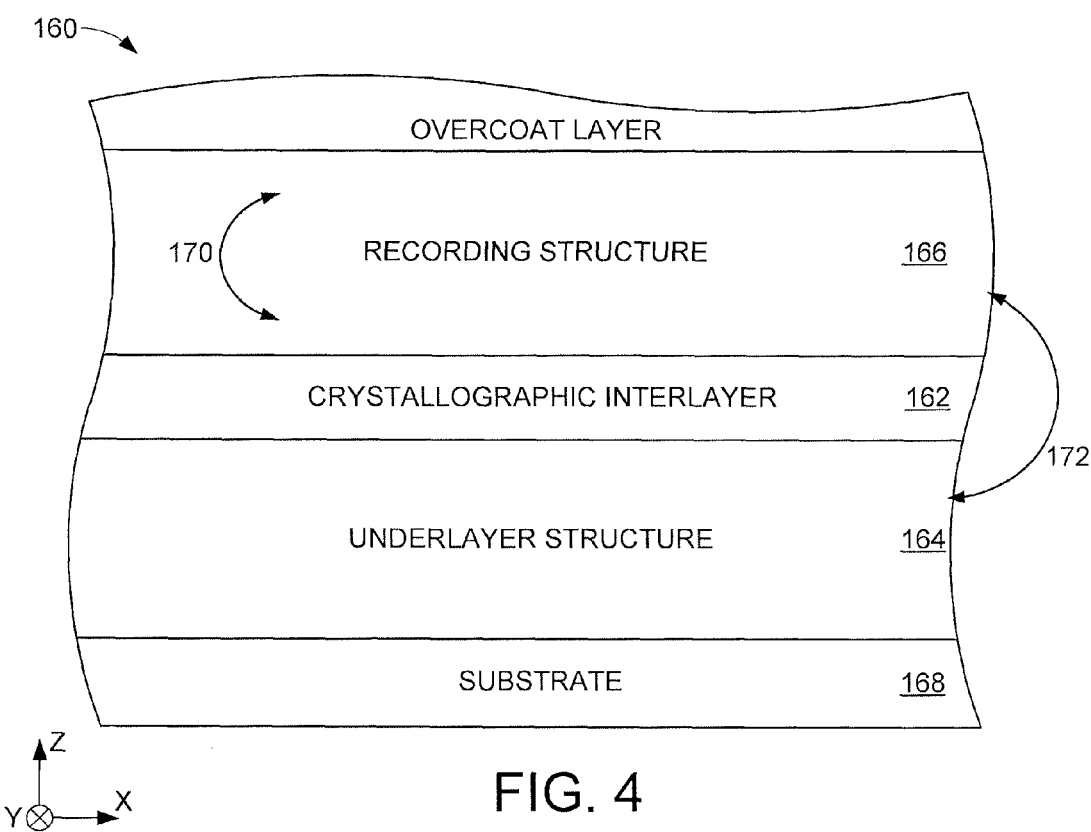
FIG. 4 provides a cross-sectional block representation of a portion of an example data storage medium configured in accordance with various embodiments.

FIG. 4 illustrates a cross-sectional block representation of a portion of an example granular core 160 that may experience unwanted exchange coupling in accordance with various embodiments. The granular core 160 can be tuned in an unlimited variety of manners to provide horizontal and perpendicular data bit grains. As shown by the single perpendicular data bit grain of FIG. 4, a crystallographic interlayer 162 can be disposed between underlayer 164 and recording 166 structures that can respectively be tuned to be one or more layers of similar or dissimilar materials. A substrate 168, such as glass or silicon, can provide a foundation on which the various data storage layers of the granular core 160 can be formed.

In some embodiments, any of the layers of the granular core 160 can be formed upon one or more seed layers, such as Ruthenium and MgO, to provide a predetermined material growth, structure, and magnetic properties. The presence of a seed layer and tuned configuration of the underlayer 164 and recording 166 structures may not be sufficient to reduce and eliminate internal grain coupling that can jeopardize the storage and reading of a data bit stored in the recording structure 166.

It is contemplated that increased sputtering pressures used to create columnar data storage grains can induce redeposition, gas incorporation, blister formation, poor mechanical performance, and correction susceptibility. Increased content reactive sputtering for grain boundaries have also been contemplated as corresponding to particle contamination, sputtering arching, and blister formation that degrade data storage performance.

While physical and chemical decoupling methods can mitigate exchange coupling between different data bit grains, internal recording structure exchange coupling 170 and recording/underlayer coupling 172 are difficult to control with current physical and chemical decoupling means. Such decoupling difficulties may be attributed to layer construction where transition metal elements, like iron and nickel, are combined with cobalt to promote exchange coupling through spin-orbit exchange and crystallographic grain growth. That is, the materials used to allow the data storage medium 160 to scale down to nanometer scale can promote internal data bit grain coupling that is difficult to mitigate, even with non-magnetic granular boundaries, like boundary 158 of FIG. 3. These difficulties have rendered the tuning of the materials of the data storage medium 160 to control internal data bit coupling while providing practical application in high data bit density data storage environments.

Figure 5:
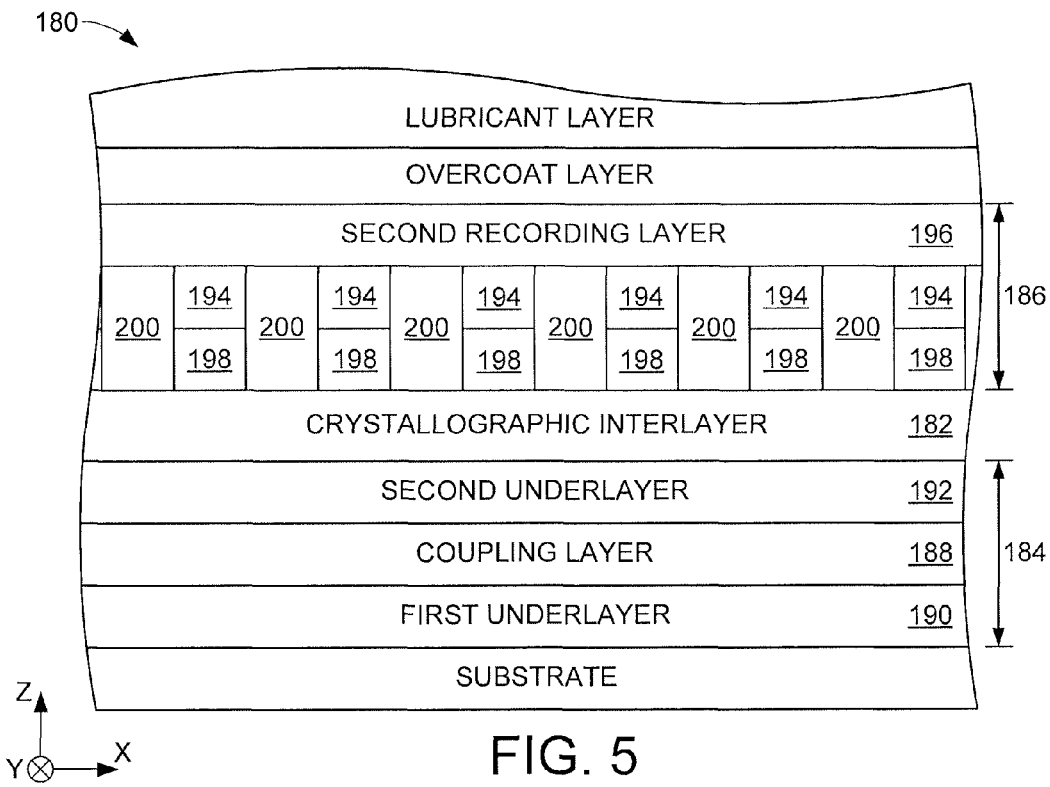
FIG. 5 illustrates a cross-sectional block representation of a portion of an example data storage medium constructed in accordance with various embodiments.

FIG. 5 displays a cross-sectional block representation of a portion of an example data storage data bit 180 constructed and operated in accordance with various embodiments. The data bit 180 can be constructed to be similar, or dissimilar to other data bits as part of a collective data storage medium, without limitation. The data bit 180 is configured with a crystallographic interlayer 182 disposed between underlayer 184 and recording 186 laminations. The crystallographic interlayer 182 can be tuned to provide an interface that promotes crystallographic growth, such as hexagonal close packed (hcp), of at least one layer of the recording lamination 186.

While not limiting or required, the underlayer lamination 184 can be constructed with a coupling layer 188 disposed between ferromagnetic underlayers 190 and 192. The coupling layer 188 may be a high magnetic coercivity material, such as an antiferromagnetic material, that maintains predetermined magnetization saturations of the soft ferromagnetic underlayers 190 and 192 without permanently pinning the underlayers 190 and 192 to a particular magnetic direction. The predetermined crystallographic growth of the recording lamination 186 along with the tuned construction of the underlayer lamination 184 can increase data bit recording performance by decreasing layer impurities and allowing programming flux to more efficiently flow through the grain 180.

Tuned construction of the recording lamination 186 may further optimize data bit programming by optimizing magnetic response to programming fields. In a non-limiting embodiment, the recording lamination 186 provides an exchange coupled composite (ECC) by positioning an exchange break layer 194 between a continuous soft magnetic layer 196 and a granular hard magnetic layer 198 in the magnetic recording lamination 186. The embodiment shown in FIG. 5 illustrates how portions of the recording lamination 186 can be separated into grains by non-magnetic boundaries 200 that extend through the exchange break 194 and granular hard magnetic layer 198 to magnetically segment portions of the recording lamination 186. Such magnetically segmented granular hard magnetic layer 198 can operate in concert with the continuous soft magnetic layer 196 to hold a programmed magnetic polarity as a data bit while optimizing data programming performance, like switching coherency and coercivity.

The tuned configuration of the recording lamination 186 into an ECC in combination with the boundary-less continuous soft magnetic layer 196 reduces programming switching fields without reducing the energy barrier of the data bit 180. Furthermore, the ECC configuration of the recording lamination 186 provides an overall recording lamination anisotropy energy and coercivity that are smaller than the value of the average of the respective soft 196 and hard 198 magnetic recording layers. For example, the tuned exchange break 194, granular hard magnetic layer 198, and non-magnetic boundaries 200 can correspond with a grain switching field that is smaller than the average magnetic anisotropy energy of the soft 196 and hard 198 magnetic layers.

The recording lamination 186 may be tuned to incorporate ECC and continuous granular composite (CGC) schemes to optimize intergrain and intragrain magnetic interactions. However, the exchange break layer 194 can fail to fully decouple the continuous soft magnetic recording layer 196 from the granular hard magnetic recording layer 198 when the granular hard magnetic recording layer 198 comprises a CoPt alloy like CoPt and CoCrPt. It is contemplated that such residual intragrain coupling can be attributed, at least in part, to the material properties of cobalt in crystallographic configurations promoted by the crystallographic interlayer 182. Despite the presence of non-magnetic granular boundaries and tuned recording lamination construction, some CoPt alloys can induce exchange coupling within the data bit 180 to the detriment of dynamic data writing performance, such as bit error rates and risk of side track erasure.

Figure 6:
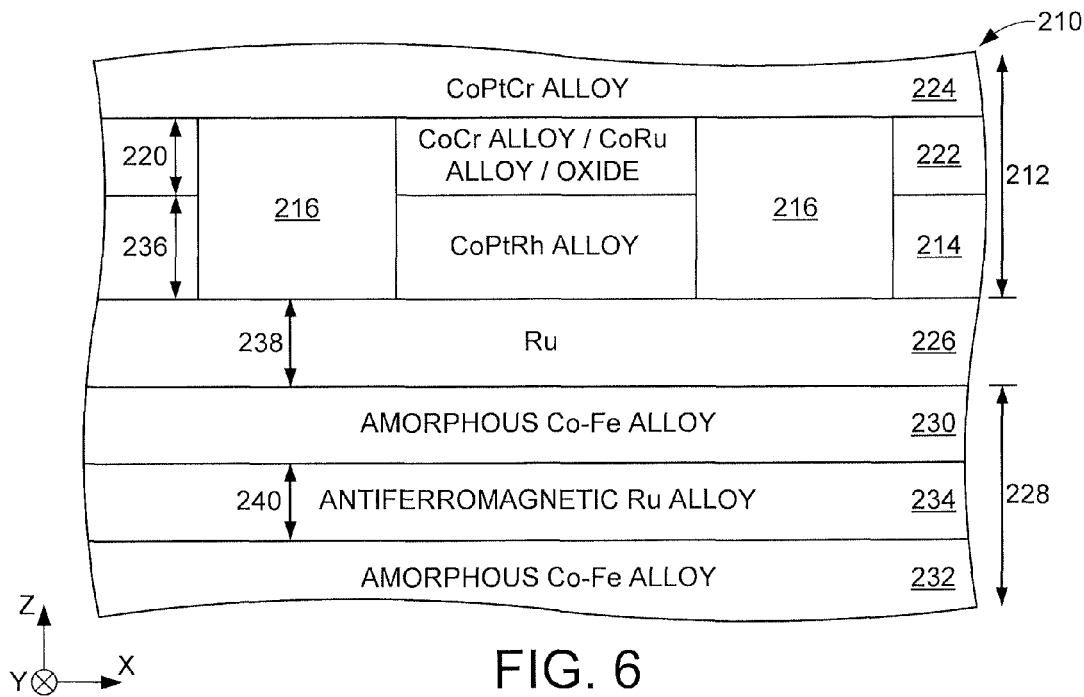
FIG. 6 is a cross-sectional block representation of a portion of an example data storage medium configured in accordance with various embodiments.

FIG. 6 shows a cross-sectional block representation of a portion of an example data storage medium 210 configured in accordance with various embodiments to mitigate intragrain coupling via tuned material construction of the recording lamination 212. Through the addition of a platinum group metal element, such as Ru, Rh, Pd, Os, and Ir, into a CoPt alloy of the hard recording layer 214, the core 216 of each data bit grain can have a tuned exchange coupling strength that is less than the exchange coupling strength of other soft recording layer 214 CoPt alloys.

While not required or limiting, assorted embodiments tune the hard recording layer 214 by manipulating the atomic percentage of the constituent elements of the $Co_XPt_{100-Y-X}Rh_Y$ alloy. For instance, X+Y can be 70-85 atomic percentage and Y can be 5-20 atomic percentage to provide saturation magnetization ($M_S$) of 550-700 emu/cc that plays a similar role to pure cobalt and is conducive to perpendicular magnetic polarity storage in at least some of the granular cores 216. Separation of the granular cores 216 by oxide boundaries 218 can operate in concert with the tuned material and thickness 220 of the exchange break layer 222 as well as the continuous soft recording layer 224 to provide optimized data storage with high areal densities.

Constructing the exchange break layer 222 of a Co alloy or oxide can serve to tune the exchange coupling between the CoPtCr alloy of the continuous soft magnetic layer 224 and granular hard magnetic layer 214 to provide an ECC that exhibits optimized magnetic programming characteristics. The tuned configuration of the recording lamination 212 can be complemented by the tuned construction of the crystallographic interlayer 226 with materials like Ru and the underlayer lamination 228 with ferromagnetic layers 230 and 232 of amorphous Co—Fe based alloy that are separated by an antiferromagnetic layer 234, like Ru.

The materials of the various data storage medium 210 layers can be further tuned by manipulating the thicknesses of the layers along the Z axis. As shown, the thickness 220 of the exchange break layer can be similar or dissimilar to the thickness 236 of the hard recording layer 214, thickness 238 of the crystallographic interlayer 226, and thickness 240 of the coupling layer 234 to control the magnetic profile through the data storage medium 210. That is, the thicknesses 220, 236, 238, and 240 can correspond with the tuned materials of the respective layers to provide predetermined perpendicular magnetic characteristics for the data storage medium 210 as a whole.

Figure 7:
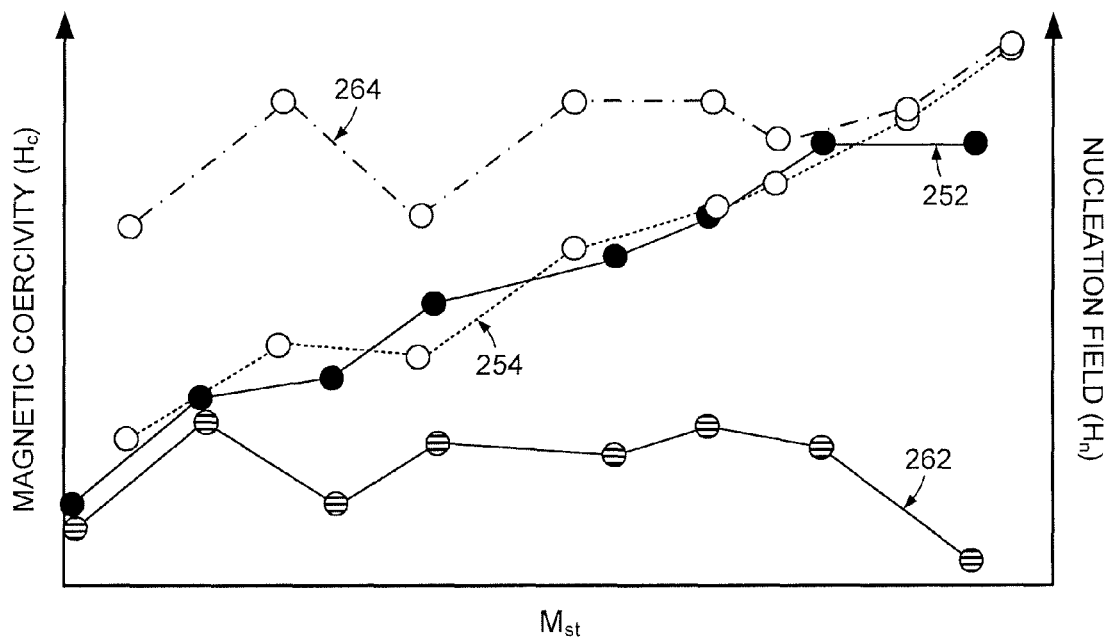
FIG. 7 plots data from an example data storage medium constructed and operated in accordance with various embodiments.

FIG. 7 plots magnetic characteristics for an example data storage medium tuned in accordance with various embodiments, such as the material and thickness configuration shown in FIG. 6. Solid line and points 252 corresponds to a data storage medium constructed with a hard recording layer of CoPtRh. Line 252 compares to segmented line and hollow points 254 that represent a data storage medium configured with a CoPt alloy hard recording layer without an additional platinum group metal element. Lines 252 and 254 illustrate the coercivity of the respective data storage medium configurations for various $M_{st}$, which is the product of saturation magnetization and magnetic layer thickness.

Solid line and segmented points 262 correspond with a CoPtRh alloy hard recording layer and compares to segmented line and hollow points 264 to illustrate the nucleation field for various $M_{st}$. The data of FIG. 7 shows how varying the nominal thickness of the hard recording layer, such as from 65-100 Å, can change the rotation angles of the saturation magnetic flux from the entire data storage medium lamination. The relatively similar slope and points of lines 252 and 254 implies that the addition of a platinum group metal element to the hard recording layer can optimize magnetic nucleation without degrading magnetic coercivity of a data storage medium.

Figure 8:
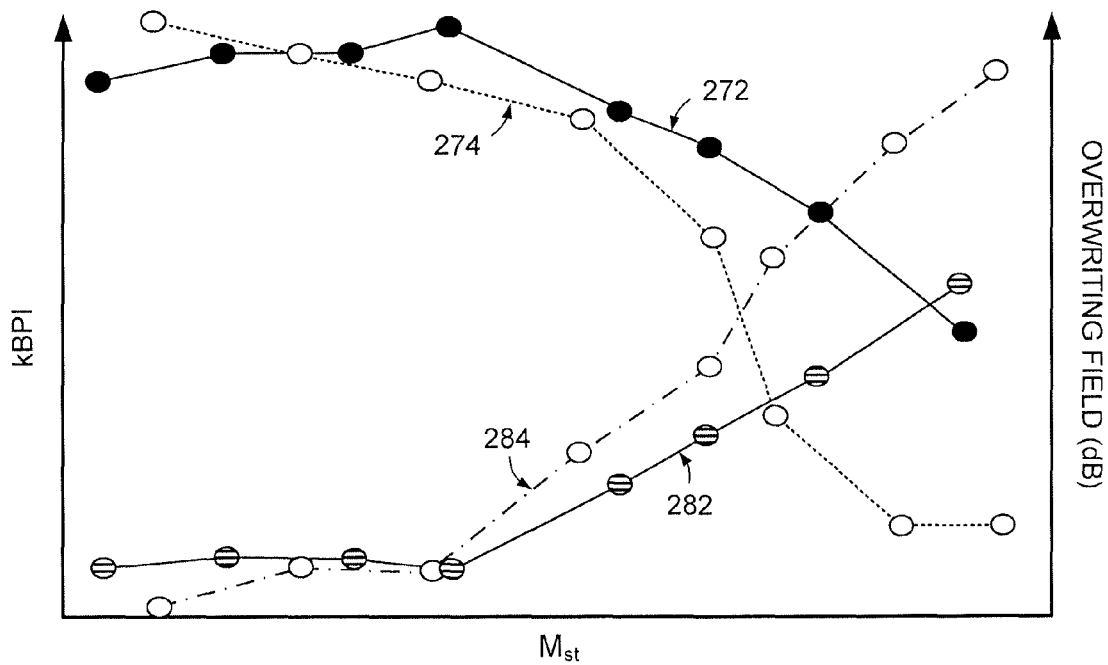
FIG. 8 provides data from an example data storage medium constructed and operated in accordance with various embodiments.

The static magnetic characteristics shown in lines 252 and 262 can correspond to dynamic magnetic characteristics optimized for various hard recording layer thicknesses. FIG. 8 displays kilo bits per inch (kBPI) and overwriting field (dB) dynamic magnetic characteristics for differently tuned data storage medium. Solid line and points 272 represents a CoPtRh alloy hard recording layer while segmented line and hollow points 274 corresponds with a CoPt alloy hard recording layer without a platinum group metal element. Lines 272 and 274 illustrate how the addition of rhodium to a CoPt alloy can increase the number of bits per inch of a data storage medium, particularly with higher magnetic layer thicknesses.

It is contemplated that an increase of transition jitter noise corresponds with greater exchange coupling experienced in CoPt alloys. In contrast shown in line 272, the addition of a platinum group metal element minimizes transition jitter by decoupling the data bit grains of a data storage medium. The addition of platinum group metal elements, like rhodium and iridium, to a hard recording layer can also make the reversal of magnetic polarity of a granular core of a data storage medium easier for a given magnetic field strength and gradient due to the stronger internal recording lamination bond corresponding with heightened intragrain exchange coupling.

Solid line and segmented points 282 illustrates the overwriting field to switch the polarity of a CoPtRh alloy hard recording layer and compares to segmented line and hollow points 284 that represents the overwriting field for a CoPt alloy hard magnetic layer with a platinum group metal element. The rapid degradation of overwriting field for larger magnetic layer thicknesses for line 284 contrasts with the relatively low increase in overwriting field for line 282 to illustrate how the addition of a platinum group metal element to the hard recording layer can decrease transition jitter and DC noise, respectively, by decoupling the hard recording layer from other portions of a data storage medium.

It can be appreciated from FIG. 8 that increased exchange coupling present in a non-platinum group metal element containing recording layer can make magnetic clusters on the data storage medium prone to bonding that resists data bit reversal and increases data recording noise. Conversely, a recording layer with a platinum group metal element added to a CoPt alloy can reduce bonding between magnetic clusters of a data storage medium to reduce data recording noise, switching gradient, and switching field while optimizing data bit and track density. The addition of the platinum group metal element can further allow thicker recording layers to be used without degrading the reversal field associated with programming one or more data bits.

Figure 9:
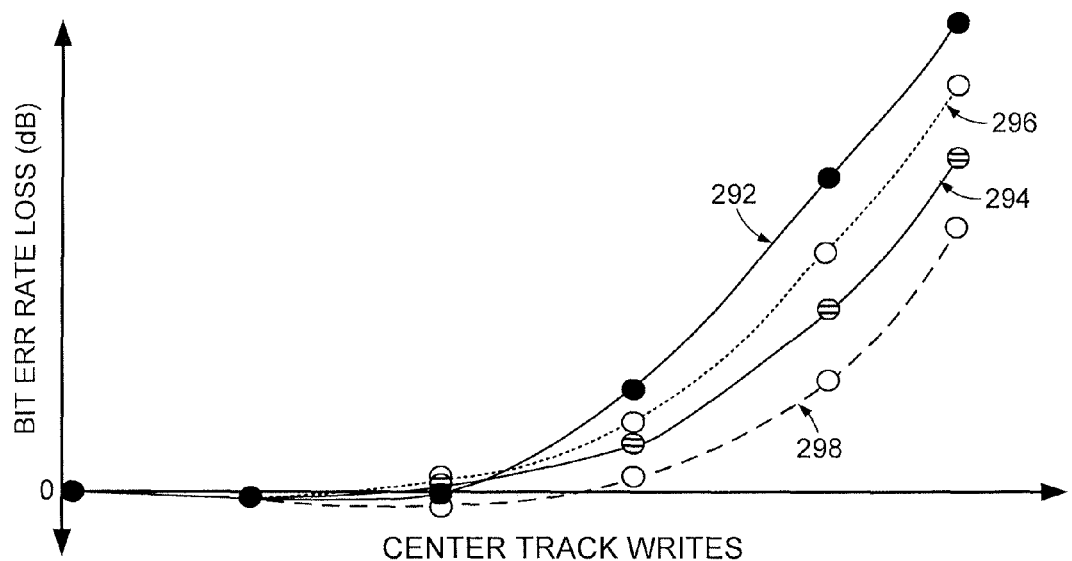
FIG. 9 graphs operational data from example data storage media configured in accordance with various embodiments.

The increased magnetic decoupling provided by a CoPt alloy having a platinum group metal element consequently heightens the areal density capability of a data storage medium. On the other hand, a CoPt alloy with elevated levels of magnetic decoupling can experience reduce areal density capabilities due at least in part to limited reverse overwriting, particularly in thicker recording layer data storage medium configurations. FIG. 9 plots dynamic operational data corresponding to example data storage media configured with different recording layer constructions in accordance with various embodiments. Solid lines 292 and 294 respectively represent bit error loss for various numbers of center track writes to a CoPtRh alloy recording layer with different thermal stability configurations.

In some embodiments line 292 corresponds with a recording layer having a 105 KuV/kt value and line 294 corresponds with a 130 KuV/kt value where Ku is uniaxial magnetic anisotropy energy, V is magnetic layer volume, k is Boltzmann constant, and T is temperature. Segmented lines 296 and 298 each represent a non-platinum group metal element CoPt alloy recording layer having 105 KuV/kt and 130 KuV/kt values, respectively. The data graphed in FIG. 9 represents loss of data 10 microinches from a data track center, which correlates to side track erasure conditions that can be attributed to the data storage medium.

As shown, bit error loss and side track erasure occurrence can be reduced by increasing the thermal stability value of a recording layer. However, such reduction in side track erasure can reduce the areal density capability of a data storage medium. Therefore, at least one recording layer of a data storage medium can be tuned for material and thickness to balance the risk of bit errors and side track erasure occurrence with the areal density capability of the medium. A non-limiting embodiment can utilize the optimized decoupling of a CoPtRh recording layer that is tuned with a 130 KuV/kt thermal stability and 0.93 $M_{st}$ to provide a 0.95 dB bit error loss and 526 Gbit per square inch areal data capability after approximately 50,000 center track writes.

Figure 10:
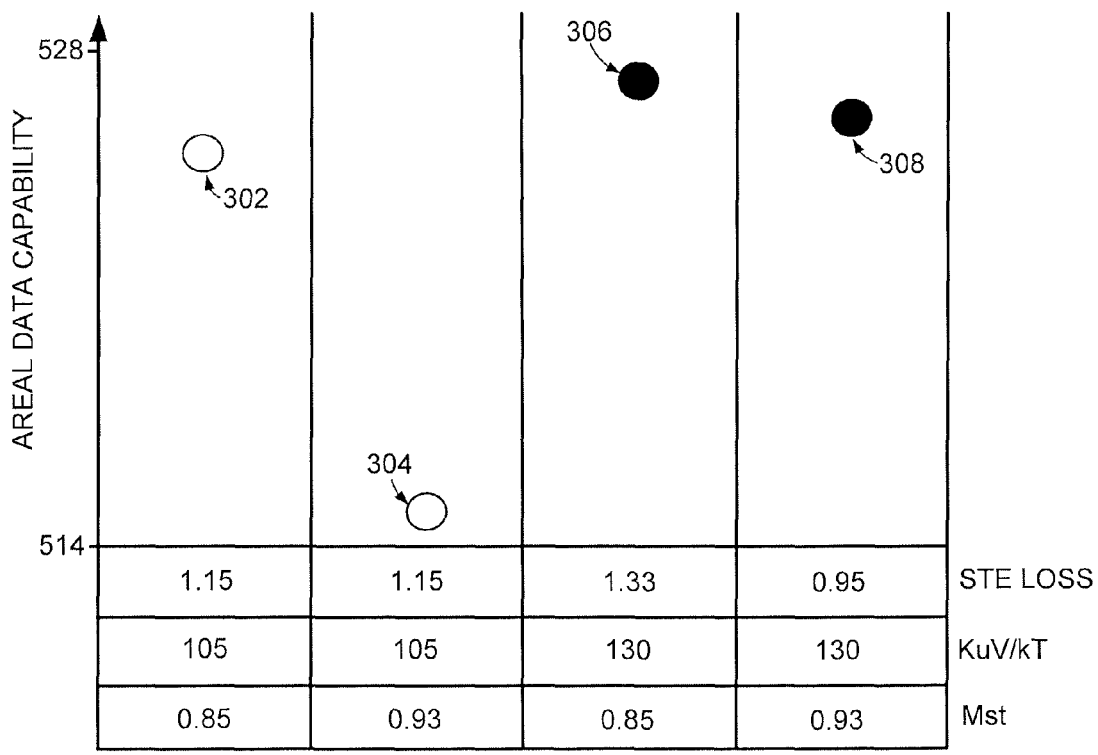
FIG. 10 shows operational and structural data from example data storage media tuned in accordance with various embodiments.

FIG. 10 provides structural and operational data from an example data media tuned in accordance with various embodiments. Open circles 302 and 304 correspond with a data storage medium configured with a CoPt alloy recording layer while closed circles 306 and 308 correspond with a CoPtRh alloy recording layer. FIG. 10 shows the areal density capability (ADC) in Gbits per square inch of various media configurations with respect to Mst, KuV/kT and STE loss at 50,000 center-track writes. Side track erasure loss can be reduced by increasing KuV/kT in the CoPt alloy recording layer media, such as from 1.15 dB to 0.75 dB (0.40 dB).

Comparatively, the utilization of a tuned CoPtRh alloy can reduce side track erasure lass from 1.33 dB to 0.95 dB (0.38 dB).

However, the reduction of the side track erasure loss in the CoPt alloy media may induce a larger ADC loss, such as from 525 to 515 Gbits per square inch, which contrasts the reduction of side track erasure loss in the CoPtRh alloy media that has much smaller ADC loss, such as from 527 to 526 Gbits per square inch. It is contemplated that the additional Rh effect into the core magnetic part of a data storage medium optimizes magnetic exchange decoupling and provides a balance between thermal stability, side track erasure loss, and ADC.

Figure 11:
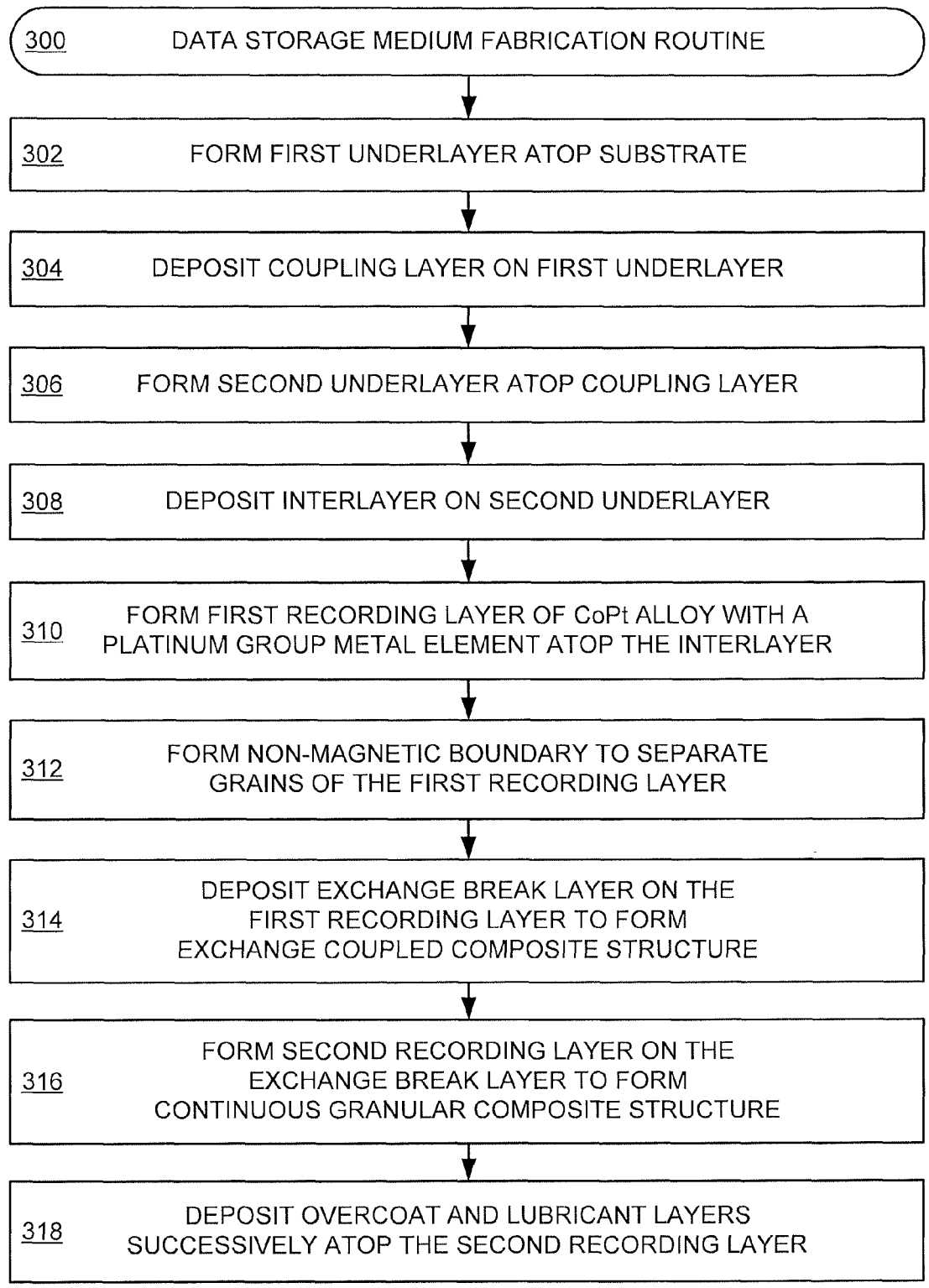
FIG. 11 is a flowchart of an example data storage medium fabrication routine conducted in accordance with various embodiments.

It should be noted that a data storage medium can be tuned in an unlimited variety of manners to create diverse static and dynamic data programming characteristics. FIG. 11 is a flowchart of an example data storage medium fabrication routine 300 that can be carried out in accordance with some embodiments. Initially, step 302 forms a first underlayer atop a substrate. One or more seed layers, such as Ru, can be disposed between the substrate and underlayer in various embodiments of step 302. A coupling layer is then deposited on to the first underlayer in step 304 to provide a predetermined saturation magnetization and anisotropy magnetic characteristics. Such magnetic characteristics can further be tuned with the addition of a second underlayer atop the coupling layer in step 306, which forms a soft underlayer (SUL) structure.

Next, step 308 deposits a crystallographic interlayer on to the SUL to provide an interface with which the first recording layer can be formed with predetermined grain growth and magnetic properties in step 310, such as anisotropy and magnetic moment. Step 310 may further encompass sputtering cobalt, platinum, and at least one platinum group metal element to grow the first recording layer to a predetermined thickness. The exchange break and first recording layers then are segregated into grains by the formation of a boundary in step 312. The boundary formed in step 312 can be continuous or segmented to separate portions of the first recording layer so that different magnetic polarities can be concurrently stored on adjacent grains.

The first recording layer is then covered with an exchange break material in step 314 to establish an exchange coupled composite structure. The deposition of the second recording layer atop the exchange break layer in step 316 can complete a recording structure and provide a continuous granular composite structure by continuously extending to span multiple different grains of the first recording layer. Step 318 completes routine 300 by successively depositing overcoat and lubricant layers atop the recording structure.

It should be noted that the various constituent layers of the data storage device created through routine 300 can be tuned with differing thicknesses and widths to provide diverse static and dynamic data recording capabilities, without limitation, For example, the first recording layer may be tuned with a different thickness than the second recording layer and the interlayer may not continuously extend to contact the entirety of the second underlayer. Accordingly, it can be appreciated that the steps of routine 300 are not required or limiting and a data storage medium can encompass any number of layers and materials to control the magnetic profile experienced during data bit recording perpendicular to the ABS.

Through the tuned construction of recording and underlayer structures of a data storage medium, intragrain decoupling can be increased without degrading the crystallographic and magnetic properties of the data storage medium.

Control of intragrain decoupling via the addition of a platinum group metal element to a recording layer can optimize dynamic recording performance, such as bit error rates and side track erasure occurrences. The ability to tune a recording structure to provide exchange coupling and continuous granular composites with increased magnetic decoupling can complement non-magnetic granular boundaries to optimize perpendicular magnetic recording to the data storage medium.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a magnetic underlayer structure and a recording structure, the recording structure comprising first and second magnetic layers with the first magnetic layer decoupled by comprising an alloy of cobalt, platinum, and rhodium comprising $Co_X Pt_{100-Y-X} Rh_Y$ where X+Y is from 70 at. % to 85 at. % and Y is from 5 at. % to 20 at. %.

2. The apparatus of claim 1, wherein the underlayer structure comprises first and second ferromagnetic layers separated by a coupling layer.

3. The apparatus of claim 2, wherein the coupling layer comprises an antiferromagnetic material.

4. The apparatus of claim 1, wherein an exchange breaking layer is disposed between the first and second magnetic layers.

5. The apparatus of claim 1, wherein a non-magnetic interlayer is disposed between the recording and underlayer structures.

6. The apparatus of claim 1, wherein the first magnetic layer of the recording structure has a first thickness and the second magnetic layer of the recording structure has a different, second thickness.

7. The apparatus of claim 1, wherein the platinum group metal element comprises a smaller atomic percentage of the alloy than cobalt or platinum.

8. The apparatus of claim 1, wherein the first magnetic layer has a thickness of 50-150 Å and a thermal stability of 80-150 KuV/kT.

9. The apparatus of claim 1, wherein the first magnetic layer is magnetically decoupled from the second magnetic layer and the underlayer structure.

10. A data storage lamination comprising a magnetic underlayer structure and a recording structure, the recording structure configured as a plurality of columnar grains and comprising first and second magnetic layers with the first magnetic layer decoupled from the second magnetic layer and comprising an alloy of cobalt, platinum, and rhodium, the columnar grains respectively separated by a non-magnetic boundary layer.

11. The data storage lamination of claim 10, wherein the first magnetic layer of the recording structure has a first thickness and the second magnetic layer of the recording structure has a different, second thickness.

12. The data storage lamination of claim 10, wherein the non-magnetic boundary layer continuously surrounds the columnar grains to laterally separate adjacent vertically aligned grains.

13. The data storage lamination of claim 10, wherein the first and second magnetic layers respectively have first and second anisotropies and the recording layer has a collective anisotropy that is lower than an average of the first and second anisotropies.

14. The data storage lamination of claim 10, wherein the second magnetic layer comprises cobalt or a cobalt alloy.

15. The data storage lamination of claim 10, wherein the recording structure forms a continuous granular composite and an exchange coupled composite.

16. A perpendicular magnetic recording medium comprising first and second data bits each comprising magnetic underlayer and recording structures, the recording structure comprising first and second magnetic layers with the first magnetic layer decoupled from the second magnetic layer by an alloy of cobalt, platinum, and a platinum group metal element, the first magnetic layers of the first and second data bits having different thicknesses.

17. The perpendicular magnetic recording medium of claim 16, wherein the second magnetic layer of the first data bit is exchange coupled with the second magnetic layer of the second data bit.

18. The perpendicular magnetic recording medium of claim 16, wherein the alloy of cobalt, platinum and rhodium is $Co_X Pt_{100-Y-X} Rh_Y$ where X+Y is from 70 at. % to 85 at. % and Y is from 5 at. % to 20 at. %.

19. The perpendicular magnetic recording medium of claim 16, wherein the platinum group metal element is rhodium.

20. The perpendicular magnetic recording medium of claim 16, further comprising a protective overcoat layer supported by the first and second data bits.

* * * * *